United States Patent Office 3,535,373
Patented Oct. 20, 1970

3,535,373
PREPARATION OF AMINO CARBOXYLIC
ACID SALTS
Philip F. Jackisch, Royal Oak, Mich., assignor to Ethyl Corporation, New York, N.Y., a corporation of Virginia
No Drawing. Filed Nov. 20, 1967, Ser. No. 684,480
Int. Cl. C07c 51/26
U.S. Cl. 260—531                6 Claims

ABSTRACT OF THE DISCLOSURE

Tertiary amino carboxylic acid salts are prepared from tertiary amino alkanols and alkali metal hydroxides as illustrated by the following equation:

$$N(CH_2CH_2OH)_3 + 3NaOH \rightarrow N(CH_2COONa)_3 + 6H_2$$

The reaction is preferably conducted in the presence of water and a cadmium oxide. This invention demonstrates that better results are achieved by promoting the reaction with a long chain alcohol used in conjunction with the water and catalyst. Lauryl alcohol is a typical promoter alcohol. Best results are obtained by use of an excess of metal hydroxide together with the water-alcohol-catalyst system.

Background of the invention

The conversion of alcohols to the corresponding alkali metal salts of carboxylic acids—by heating the alcohols with alkali metal hydroxides—has been known for over 125 years. In this regard, reference is made to Dumas and Stas, 35 Ann. 129–73 (1840).

The reaction has been extended to amino alcohols; U.S. 2,384,816 and British Pat. 601,816. Attention is directed to Example V of both patents. There a method is described for preparing the tripotassium salt of nitrilotriacetic acid. The method of the example comprises heating—in the presence of water—one mole of triethanolamine with 4.0 moles of potassium hydroxide. (This amounts to a 1.0 mole excess of the hydroxide.) As reported in the example, the total gas volume after 16 hours was 38 liters.

Calculations indicate that the yield of desired salt was very low. Had the reaction gone to completion, six moles of hydrogen would have evolved. (This is depicted by the equation above.) As standard temperature and pressure, six moles of gas occupies 134.4 liters.

Examples II–IV of the above-cited patents also indicate that the patented process affords relatively low yields of other tertiary amino acid salts.

Attention is also directed to U.S. 2,384,217 and British Pat. 601,817. These patents are closely related to those cited above. More specifically, they are directed to use of metal catalysts—such as cadmium oxide—to promote the reaction process described in the aforementioned patents.

U.S. 2,384,817 (page 4, left-hand column, lines 71–72) states that the process of that patent can be used to prepare tricarboxymethyl amine from triethanolamine. However, no specific example illustrating this reaction is given in the patent (or its British counterpart). Because the preparation of salts of the carboxylic acid corresponding to triethanolamine is a preferred embodiment of my invention, I reacted that amine with sodium hydroxide using cadmium oxide as a catalyst as taught by the patents cited, taking pains to isolate as much product as possible.

More specifically, to a stainless steel flask, fitted with a water separator and a condenser, was charged 18.55 g. (0.126 mole) of triethanolamine, 21.8 ml. of 50.1 percent sodium hydroxide solution (0.415 mole or NaOH) and 1.0 g. (0.00779 mole) of cadmium oxide. Evolved gas was measured with a wet test meter. The reaction mixture was heated with a silicone oil bath.

The temperature of the oil bath was raised to 150° C. and most of the water collected. The temperature of the bath was raised to 220° C. and maintained at that temperature for 18 hours at which time gas evolution had essentially ceased. Total gas evolution was 11.55 liters (61.6 percent of theory based on triethanolamine).

The contents of the flask were cooled, 150 ml. of water added and the mixture refluxed for a day to dissolve the contents.

The solution was removed and another 150 ml. of water added. Refluxing was carried out for three more days. This dissolved the remaining contents of the flask.

Both solutions were combined, concentrated on a rotary evaporator, then filtered hot, cooled and diluted to 250 ml. in a volumetric flask.

A qualitative test indicated that a chelating agent was present. Two 10 ml. samples were removed and analyzed for chelating power. The average of the two values corresponded to a yield of 50.2 percent of the theoretical chelating power if all triethanolamine was converted to the compound, $N(CH_2COONa)_3$.

The remaining 230 ml. of solution was acidified to pH 2 with cold sulfuric acid. The acidified solution was evaporated slowly until sodium sulfate just started to crystallize. A white solid, not sodium sulfate, was collected by filtration, water washed, and air dried. It weighted 3.04 grams and had a melting point at 245° d.

A sample was recrystallized from boiling water and had a melting point of 248° d. An infrared sample was identical in all significant details with an authentic sample of $N(CH_2COOH)_3$. Assuming all the 3.04 g. of product was NTA, then the yield was 8.8 percent.

As demonstrated, use of the prior art method gave a low yield of desired product. The experiment reported above also indicates that yields based on chelating effect are misleading as are yields based on amount of gas evolved.

In contrast to the above-cited prior art as shown by the examples below, the process of this invention affords substantially increased yields of acids and acid salts corresponding to amino alcohols.

Summary of the invention

The heart of this invention comprises the discovery of the promoter effects of long chain alcohols—in a process which comprises reacting an amino alcohol with an alkali metal hydroxide in the presence of water and a cadmium catalyst.

Thus, in a process which comprises preparation of an alkali metal salt of a tertiary amino carboxylic acid by reacting a tertiary amino alcohol with an alkali metal hydroxide—in the presence of water and a cadmium catalyst—this invention provides the improvement of conducting the process in the presence of a promoter quantity of a long chain alcohol. A preferred embodiment comprises use of an excess of sodium hydroxide in the process.

In general, the salts produced by this process are old compounds, and they have the many uses known for them. Thus, they are chemical intermediates, e.g. yielding the free acids upon acidification. In the main, the acids undergo all the reactions characteristic of carboxylic acids. In addition, the salts are useful in their own right as chelating agents. Nitrilotriacetic acid trisodium salt is becoming of increased importance as an ingredient in detergent formulations.

Description of preferred embodiments

The alkali metal hydroxides employed in my process are preferably sodium and potassium hydroxide. Sodium hydroxide is most preferred because it is cheaper.

The tertiary amine alcohols employed in this proces are characterized by a tertiary amino nitrogen atom, that is, an amine nitrogen bonded to three carbons. They are also characterized by the presence of at least one primary alcohol group; —CH$_2$OH. In other words, the process of this invention is not applicable to conversion of secondary and tertiary alcohol groups to acid radicals.

It is only necessary that the alkanol amine be stable, reactive, and unhindered. A reactant is stable if it and the product produced therefrom are stable—at least to some appreciable extent—under the reaction conditions employed. Likewise, an amine is reactive if it is free from chemical groups which cause extraneous side reactions to a deleterious degree and is free of chemical groups in such juxtaposition with the reactive sites that they prevent those sites from undergoing the desired reaction because of a perturbation of their electronic configuration. A reactant is unhindered if it is free of groups so bulky that they prevent the reaction from taking place by steric hindrance. So long as these criteria are satisfied, an alkanol amine is applicable.

A preferred class of amino alkanols used as starting materials in this invention have the formula

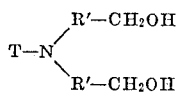

wherein R' is an alkylene radical, straight or branched chain, having up to about four carbons and T is a radical selected from (i)                       —R'—CH$_2$OH (ii) 

and (iii) 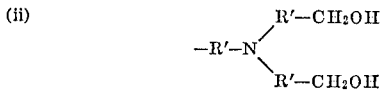

wherein R' has the same significance as above and R'' is H or an alkyl rardical of up to 4 carbons.

Because they are more readily available, highly preferred tertiary amino alcohols are those having

—CH$_2$—CH$_2$OH groups bonded to the nitrogen. The simplest compound of this type is triethanolamine, N(CH$_2$CH$_2$OH)$_3$. Other amino alcohols within this preferred class are prepared by reacting ethylene or propylene diamine with ethylene oxide. They have the formula

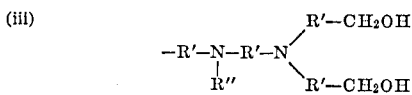

wherein R'' is methyl or hydrogen.

Another preferred compound is prepared from diethylene triamine and ethylene oxide and has the formula

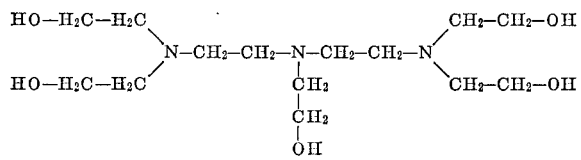

The analogous compound prepared from ethylene oxide and triethylene tetramine is also a preferred starting material. With regard to the preparation of the polyamino compounds mentioned above, reference is made to page 6 of British Pat. 601,817.

Good results are achieved when at least a stoichiometric amount of alkali metal hydroxide is employed. Best yields are obtained when the hydroxide is used in excess. Hence, I prefer to use at least a 10 mole percent excess of alkali metal hydroxide. Thus, for example, when reacting one mole of triethanolamine (which has three reactable hydroxy groups) I prefer to use at least 3.3 moles of metal hydroxide. There appears to be no real upper limit on the amount of excess hydroxide and this is governed by economics, size of reaction vessel, ease of separation of desired product, and similar considerations. Generally good results are obtained when up to 0.5 mole excess is employed, but greater amounts of metal hydroxide can be used, if desired.

The cadmium catalyst can be a wide variety of cadmium containing materials such as cadmium metal, cadmium oxide, simple cadmium (II) salts as cadmium acetate, propionate, or butyrate as well as cadmium chloride and sulfate. The range of amounts of catalyst is one atom of cadmium for each 10 to 1000 primary hydroxyl groups in the aminoalkanol to be reacted. An optimum range in many instances is one atom of cadmium per each 20 to 200 primary alcohol groups (in the amino alkanol to be reacted).

The promoter alcohol is a long chain primary alcohol having the formula R—CH$_2$OH wherein R is a hydrocarbyl alkyl radical. Best results are achieved when the alcohol has at least 10 carbon atoms. I am unaware of any real upper limit on the number of carbons but prefer use of alcohols of 10–25 carbons, especially 10–20 carbon atoms, because these alcohols are more readily available. Although it is not necessary to use straight chain alcohols, htey are preferred because of availability. Alcohols having α-methyl branching are another preferred class of promoter alcohols. The amount of alcohol employed is from 0.05 to 10 moles per mole of catalyst. A preferred range is from 0.1 to 1.0 mole.

For the process of this invention, water is a necessary ingredient. As appreciated by a skilled practitioner, the amount of water present will be governed to some extent by the reaction temperature, which preferably, is within the range of from about 150° to about 260° C.; preferably 190–240° C. In general, it can be stated that the amount of water used is from about 3 to about 10 moles per mole of triethanolamine. However, it is not necessary to carefully add this amount of water to the reaction zone. In fact, a preferred method for getting water into the reaction zone is to add the metal hydroxide in the form of a concentrated solution, (say 50 percent by weight) and then heat the reaction mass in an open vessel until the desired reaction temperature is obtained.

The reaction pressure is not critical; ambient and superatmospheric pressures up to say 1000 p.s.i.g. can be used. The reaction time is somewhat extended; good results being usually achieved in 8–70 hours.

The method of adding the reactants to the reaction zone is not critical. If desired, all reactants can be added to the vessel and the contents can then be heated to reaction temperature. It has also been found that the water, promoter and/or catalyst can be added incrementally and good results are achieved. It has also been found that in many cases it is desirable to add an anti-foaming agent to decrease mechanical problems caused by foaming.

At some instances in the examples, nitrilotriacetic acid is abbreviated as NTA.

EXAMPLE I

A stainless steel Erlenmeyer flask was charged with 26.09 g. (0.175 mole) of triethanolamine, 3.08 g. (0.0165 mole of lauryl alcohol), 25.0 ml of 50.1 percent sodium hydroxide solution, and 2.00 g. of cadmium oxide. The reaction flask was fitted with a water separation trap, topped with a condenser. Gas evolution was measured with a wet test meter. Heating was done with a temperature regulated silicone oil bath.

The reaction mixture was heated gradually and essentially all of the water in the reaction distilled over into the trap. The temperature was raised to 225–230° and the reaction was run until the rate of gas evolution was very slow. The reaction mixture was cooled and then water, or in some cases, water, sodium hydroxide, and cadmium oxide were added and the mixture was refluxed. A pseudo first order rate constant was calculated for the various segments of the total reaction time. These results are tabulated in Table 1.

TABLE 1

| Time of heating, hrs. | Temperature, degrees | Material added | $k_1 \times 10^6$ sec. | Cumulative gas evolution, percent of theory |
|---|---|---|---|---|
| 1.0 | 225–230 | | 48 | 23.1 |
| 16.3 | 225–230 | | 1.9 | 31.1 |
| 2 | Reflux | 20 ml. H$_2$O, 5 ml. 50 percent NaOH, 0.8 g. CdO | | |
| 17.2 | 225–230 | | 8.8 | 62.5 |
| 2 | Reflux | 20 ml. H$_2$O | | |
| 1.4 | 225–230 | | 33 | 78.7 |
| 16 | Reflux | 20 ml. H$_2$O, 5 ml. 50 percent NaOH, 1.0 g. CdO | | |
| 5.8 | 225–230 | | 27 | 90.2 |
| | Reflux | 50 ml. water | (¹) | |

¹ Excessive foaming.

The reaction was terminated when forming of the reaction mixture made it impossible to distill off water and raise the temperature of the reaction mixture to a reasonable operating temperature.

An additional 50 ml. of water was added to the flask and the mixture was refluxed for 1 hour. The contents of the flask were poured out and 200 ml. of water was added and refluxed for 2 hours. The flask was emptied and rinsed several times with water. The aqueous mixture behaved like a soap solution. It was diluted further and filtered hot to remove cadmium oxide. Upon cooling the solution set into a gel. Celite filter aid was added and the mixture was vacuum filtered at room temperature to remove most of the soap. After diluting the solution to one liter, two samples were taken and titrated to find the sequestering value. An average value of 42.4 percent of theory was obtained.

The remaining solution was concentrated in a rotary evaporator to 300 ml., then cooled and filtered to remove precipitated soap. The solution was carefully acidified to pH 1–2 with concentrated sulfuric acid and concentrated on a rotary evaporator to 100–150 ml. The solution was cooled, crystals were collected and air dried, M.P. 244° d. A second and a third crop of crystals were obtained by concentrating the mother liquors. The total weight of crude NTA collected was 22.18 g. (71.3 percent).

The crude NTA was boiled with 1.5 liters of water and filtered hot to remove resinous material. The filtrate was boiled for one hour with 2 g. of Norite A decolorizing charcoal, then filtered hot. Several crops of white crystals weighing 16.38 g. (52.7 percent) were obtained.

An infrared spectrum of the product was identical in all significant details with a spectrum of authentic NTA.

EXAMPLE II

A reaction vessel was charged with 21.16 g. (0.142 mole) of triethanolamine,
0.85 g. (0.00662 mole) of cadmium oxide,
30 ml. (0.571 mole NaOH) of 50.1 percent aqueous sodium hydroxide,
0.2 ml. of Fischer Laboratory Aerosol,
0.2 ml. of Dow-Corning Anti-Foam A Silicone Oil, and
2.0 ml. of lauryl alcohol.

The mixture was heated removing water and maintained at 220° C. for two hours. Gas evolution amounted to 37.4 percent of theory after this time.

The mixture was cooled and 1 ml. of lauryl alcohol, 3 ml. of 50.1 percent sodium hydroxide solution, 10 drops of Laboratory Aerosol; 10 drops of Anti-Foam, 20 ml. of water and 0.70 g. of cadmium oxide was added. After 24 hours at 220° C., gas evolution amounted to 92.7 percent of theory.

The mixture was cooled and 30 ml. of water, 3 ml. of sodium hydroxide 50.1 percent solution, 1 ml. of lauryl alcohol, 1.0 gram of cadmium oxide, and 10 drops each of Aerosol and Anti-Foam were added. The reaction mixture was held at 220° C. for 18 hours and gas evolution reached 98.5 percent of theory. To the cooled mixture was added 20 ml. of water. After two hours at 225° C., gas evolution reached 99.1 percent of theory. The reaction was terminated.

The reaction mass was dissolved in water. Extraction with ether removed unreacted lauryl alcohol. Subsequent filtration removed sodium laurate and catalyst.

The aqueous filtrate was concentrated, acidified to pH 0 with sulfuric acid and further concentrated to 200 ml. It was seeded with a few pure crystals of nitrilotriacetic acid and left to stand.

White crystals were formed, collected, washed several times with water, then with acetone and finally, ether. After air drying the crystals weighed 17.63 g. and were identified as nitrilotriacetic acid. The yield was 65.0 percent.

The filtrate was concentrated and 0.05 gram of ferrous sulfate and 20 ml. of nitric acid added. The mixture was heated on a steam bath for two hours and adjusted to pH 2.2 with sodium hydroxide. Crystals which formed were collected, washed with water, acetone, ether, acetone, water, acetone, and ether. After air drying, the crystals weighed 5.83 grams (21.5 percent yield) and identified as nitrilotriacetic acid.

Thus, the total yield of nitrilotriacetic acid (NTA) was 86.5 percent.

EXAMPLE III

A 300 ml. Pyrex 300 ml. Erlenmeyer flask was charged with 43.79 g. (0.294 mole) of triethanolamine, 4.76 g. (0.0371 mole) of cadmium oxide, 54 ml. (1.03 mole) of 50.1 percent sodium hydroxide solution, 10 ml. of lauryl alcohol (0.0446 mole), 10 drops of Dow-Corning Anti-Foam A Emulsion, and 10 drops of Fisher Laboratory Aerosol. The remaining equipment was similar to that described in the preceding examples. The reaction mixture was heated to 230° for 21 hours, then cooled; 75 ml. of water, 10 drops of wetting agent, and 10 drops of anti-foam were added, and heating was resumed. After 18 hours at 230° the mixture was cooled and 75 ml. of water, 10 drops of wetting-agent, and 10 drops of anti-foam were added, and heating was resumed. After 20 hours at 230° the gas evolution had reached theory and the reaction was cooled. The pseudo-first order rate constant had reached a maximum value of 0.140 hr.$^{-1}$.

The contents of the reaction flask were partially dissolved in a liter of boiling water. Some sodium laurate had been formed and this soap, along with unreacted lauryl alcohol made filtering off of the cadmium metal catalyst very difficult. After filtration the filtrate and washings were concentrated to 1.5 liters, acidified to pH 2.75 with sulfuric acid and continuously extracted with ether for 24 hours. An insoluble residue remained and the aqueous solution was diluted to 4 liters, then heated to boiling and filtered hot. The filtrate was concentrated to about 2 liters, acidified to 1.8 and allowed to stand over the weekend. A first crop of white crystals weighing 46.83 g. M.P. 250° d. was obtained. The filtrate was acidified to pH 1.0 and concentrated. A second crop of 2.48 g. M.P. 246° d. was obtained. Total weight of isolated NTA was 49.31 g. (87.8 percent).

Similar results are obtained if cadmium metal, cadmium acetate, cadmium propionate, cadmium butyrate, cadmium sulfate or cadmium chloride is used as the catalyst in the above procedure.

Similar results are also obtained when n-undecyl alcohol, n-tridecyl alcohol, n-tetradecyl alcohol, n-pentadecyl alcohol, cetyl alcohol, stearyl alcohol, and eicosyl alcohol are used as the promoter.

Similar results are obtained when the reaction temperature is 150°, 220° or 240° C.

Similar results are obtained when the amount of sodium hydroxide is from 3.3 to 4.15 moles per mole of triethanolamine.

EXAMPLES IV-VIII

Other amino alkanols can be reacted according to the process of this invention. To illustrate this, other preparations following the procedure of Example III are summarized below. In each instance below the catalyst added to the reaction mixture is cadmium oxide. In the first two preparations, the promoter is decyl alcohol. In the remainer, the promoter is eicosyl alcohol. The first preparation is conducted at 190° C., the next at 210°, all others at 230-240° C. Ambient pressures are used.

In the first example below a 10 mole percent excess of sodium hydroxide is employed. In all others, a 50 mole percent excess is used. The amount of catalyst in all but the first preparation below is equivalent to one atom of cadmium per each 20 hydroxyl groups in the amino alkanol. In the first, the amount of catalyst is one atom of cadmium per each 200 hydroxyl groups in the amino alkanol. In the first example below, the amount of promoter is 1.0 mole per mole of alkanolamine. In all others the amount of promoter is 0.05 mole per mole of alkanol amine. In the first example below the amount of water is 3 moles per mole of alkanol amine, in all others 10 moles per mole of alkanol amine is employed.

| Example | Alkanolamine | Product |
|---|---|---|
| IV | Monoethanolamine | Glycine. |
| V | Tetraethanol ethylene diamine. | Tetracarboxymethyl ethylene diamine. |
| VI | Tetraethanol propylene diamine. | Tetracarboxymethyl propylene diamine. |
| VII | Pentaethanol diethylene triamine. | Pentacarboxymethyl diethylene triamine. |
| VIII | Hexaethanol triethylene tetramine. | Hexacarboxymethyl triethylene tetramine. |

EXAMPLES IX-XIII

Examples IV-VIII are repeated using potassium hydroxide instead of sodium hydroxide.

Having fully described the process of this invention, it is desired that the scope of the protection granted be limited solely by the lawful scope of the appended claims.

I claim:

1. In a process for the preparation of an alkali metal salt of a tertiary amino carboxylic acid, which comprises reacting
   an alkali metal hydroxide selected from NaOH and KOH, with
   a tertiary amino alcohol having at least one primary alcohol group,
said process being conducted in the presence of water and a cadmium catalyst; the improvement which comprises
   conducting said process in the presence of from about 0.05 to about 1.0 mole—per each mole of amino alcohol—of an alcohol having the formula $$R\text{---}CH_2OH$$

wherein R is a primary alkyl group of from about 9 to about 19 carbon atoms.

2. The process of claim 1 wherein said metal hydroxide is sodium hydroxide.

3. The process of claim 2 wherein said amino alcohol is triethanolamine.

4. The process of claim 3 wherein from 3.3 to 4.15 moles of sodium hydroxide are used per each mole of triethanolamine.

5. The process of claim 4 wherein said process is conducted at a temperature within the range of from about 150° to about 240° C.

6. The process of claim 5 wherein said promoter is lauryl alcohol.

References Cited
UNITED STATES PATENTS 2,384,817  9/1945  Chitwood  260—531

LORRAINE A. WEINBERGER, Primary Examiner

D. E. STANZEL, Assistant Examiner